United States Patent
Jung et al.

(10) Patent No.: US 9,736,735 B2
(45) Date of Patent: Aug. 15, 2017

(54) CONFIGURATION HANDLING-BASED OPERATING METHOD IN WIRELESS COMMUNICATION SYSTEM AND APPARATUS SUPPORTING SAME

(71) Applicant: LG ELECTRONICS INC., Seoul (KR)

(72) Inventors: Sunghoon Jung, Seoul (KR); Youngdae Lee, Seoul (KR); Seungjune Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/769,358

(22) PCT Filed: Feb. 21, 2014

(86) PCT No.: PCT/KR2014/001442
§ 371 (c)(1),
(2) Date: Aug. 20, 2015

(87) PCT Pub. No.: WO2014/129850
PCT Pub. Date: Aug. 28, 2014

(65) Prior Publication Data
US 2016/0007237 A1 Jan. 7, 2016

Related U.S. Application Data

(60) Provisional application No. 61/767,763, filed on Feb. 21, 2013.

(51) Int. Cl.
*H04W 36/00* (2009.01)
*H04L 12/24* (2006.01)
(Continued)

(52) U.S. Cl.
CPC ..... *H04W 36/0011* (2013.01); *H04L 41/0816* (2013.01); *H04L 41/12* (2013.01);
(Continued)

(58) Field of Classification Search
CPC ........... H04W 72/0406; H04W 72/042; H04W 74/0833; H04W 88/08; H04W 76/046;
(Continued)

(56) References Cited

U.S. PATENT DOCUMENTS

2011/0038347 A1* 2/2011 Patil ................. H04W 36/0055
370/331
2011/0149894 A1* 6/2011 Luo ...................... H04W 16/02
370/329
(Continued)

FOREIGN PATENT DOCUMENTS

| WO | 2012-118345 A2 | 9/2012 |
| WO | 2012123616 A1 | 9/2012 |
| WO | 2012-146305 A1 | 11/2012 |

*Primary Examiner* — Olumide T Ajibade Akonai
(74) *Attorney, Agent, or Firm* — Dentons US LLP

(57) ABSTRACT

Disclosed is an operation method carried out by user equipment in a wireless communication system. The method comprises: connecting to a first serving cell; connecting to a second serving cell; and handling configuration used for operating from the second serving cell when the second serving cell is released from being a serving cell. The first serving cell is a primary cell (PCell), and the second serving cell is a secondary cell (SCell).

9 Claims, 16 Drawing Sheets

(51) Int. Cl.

| | | |
|---|---|---|
| *H04W 16/32* | (2009.01) | |
| *H04W 24/08* | (2009.01) | |
| *H04W 72/04* | (2009.01) | |
| *H04W 24/10* | (2009.01) | |
| *H04W 48/16* | (2009.01) | |
| *H04W 36/04* | (2009.01) | |
| *H04W 48/08* | (2009.01) | |
| *H04L 12/26* | (2006.01) | |

(52) U.S. Cl.
CPC ............ *H04W 16/32* (2013.01); *H04W 24/08* (2013.01); *H04W 24/10* (2013.01); *H04W 48/16* (2013.01); *H04W 72/04* (2013.01); *H04L 41/0843* (2013.01); *H04L 43/0876* (2013.01); *H04W 36/0016* (2013.01); *H04W 36/04* (2013.01); *H04W 48/08* (2013.01)

(58) Field of Classification Search
CPC ... H04W 88/02; H04W 24/10; H04W 76/025; H04W 24/02; H04W 72/04; H04W 72/0453; H04W 28/00; H04W 16/14; H04W 36/0005; H04W 36/0016; H04W 36/14
See application file for complete search history.

(56) References Cited

U.S. PATENT DOCUMENTS

| | | |
|---|---|---|
| 2012/0106511 A1 | 5/2012 | Wu |
| 2012/0327797 A1 | 12/2012 | Siomina et al. |
| 2013/0235844 A1* | 9/2013 | Ge ................. H04W 36/00 370/331 |

* cited by examiner

CONFIGURATION HANDLING-BASED OPERATING METHOD IN WIRELESS COMMUNICATION SYSTEM AND APPARATUS SUPPORTING SAME

This application is a National Stage Entry of International Application No. PCT/KR2014/001442, filed Feb. 21, 2014, and claims the priority to and benefit of U.S. Provisional No. 61/767,763 filed Feb. 21, 2013, all of which are hereby incorporated by reference in their entirety for all purposes as if fully set forth herein.

BACKGROUND OF THE INVENTION

Field of the Invention

The present invention relates to wireless communication and, more particularly, to an operation method based on configuration handling in a wireless communication system and an apparatus supporting the same.

Related Art

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

Quality of service now provided to UE may be deteriorated or a cell capable of providing a better service may be detected due to the mobility of UE as a mobile device. Accordingly, the UE may move to a new cell, and such an operation is called the execution of the movement of UE. UE may deviate from an existing cell that has been accessed or camped on depending on mobility and may access or camp on a new cell. If UE moves from an existing cell to a new cell, control information for the operation of the UE may be required. A network may provide the UE with corresponding configuration information.

UE may configure a plurality of serving cells and operate. A specific serving cell may be a primary cell (PCell) and may provide a service to UE. Another serving cell may be a secondary cell (SCell) and may provide a service to UE. For example, a macro cell having wide coverage may be configured as a PCell, and a micro cell or a small cell (e.g., a femto cell or a pico cell) present in the coverage of a macro cell may be configured as an SCell.

As UE moves, a specific cell may be added as a new serving cell of the UE, and a specific cell, that is, an existing serving cell, may be released from the serving cell. Configuration information provided in order for UE to be provided with a service from a serving cell or for the UE operate within the serving cell may be handled as the serving cell is added or the serving cell is released. A method for handling a configuration depending on the addition and/or release of a serving cell in an environment in which a plurality of serving cells has been configured for UE needs to be proposed.

SUMMARY OF THE INVENTION

An object of the present invention is to provide an operation method based on configuration handling in a wireless communication system and an apparatus supporting the same.

In one aspect, provided is an operation method performed by user equipment in a wireless communication system. The method includes connecting to a first serving cell, connecting to a second serving cell and handling a configuration used in an operation in the second serving cell when the second serving cell is released from a serving cell. The first serving cell is a primary cell (PCell), and the second serving cell is a secondary cell (SCell).

The configuration may comprise a measurement configuration for performing measurements and a report on the second serving cell.

Te measurement configuration may be a measurement configuration for relaxed measurements, and the relaxed measurements comprise measurements performed with lower frequency than common measurements.

Te measurement configuration may be a measurement configuration for relaxed measurements, and the relaxed measurements comprise measurements in which an omission of use of a measurement gap configured in the user equipment is permitted.

Handling the configuration may comprise releasing the measurement configuration.

The configuration may be a bearer configuration configured in the second serving cell.

Handling the configuration may comprise relocating a bearer served by the second serving cell based on the bearer configuration.

Relocating the bearer may comprise reassociating a data radio bearer (DRB) served by the second serving cell with the first serving cell.

Reassociating the DRB with the first serving cell may comprise a reassociation of a packet data convergence protocol (PDCP).

The reassociation of the DRB with the first serving cell may comprise a reassociation of radio link control (RLC).

The first serving cell may be a macro cell, and the second serving cell may be a small cell deployed in coverage of a macro cell.

In another aspect, provided is a wireless device operating in a wireless communication system. The wireless device includes a radio frequency (RF) unit which sends and receives radio signals and a processor operatively coupled to the RF unit. The processor is configured to connect to a first serving cell, connect to a second serving cell and handle a configuration used in an operation in the second serving cell when the second serving cell is released from a serving cell. The first serving cell is a primary cell (PCell) and the second serving cell is a secondary cell (SCell).

In accordance with the operation method based on configuration handling according to an embodiment of the present invention, when a serving cell is released, UE can handle the measurement configuration and/or bearer configuration of the corresponding cell. The execution of unnecessary measurement and unnecessary signaling for a measurement report can be prevented because a measurement configuration is released when a cell is released. Use efficiency of radio sources can be improved and data throughput can be improved because a bearer is switched when a cell is released.

DESCRIPTION OF EXEMPLARY EMBODIMENTS

Figure 1:
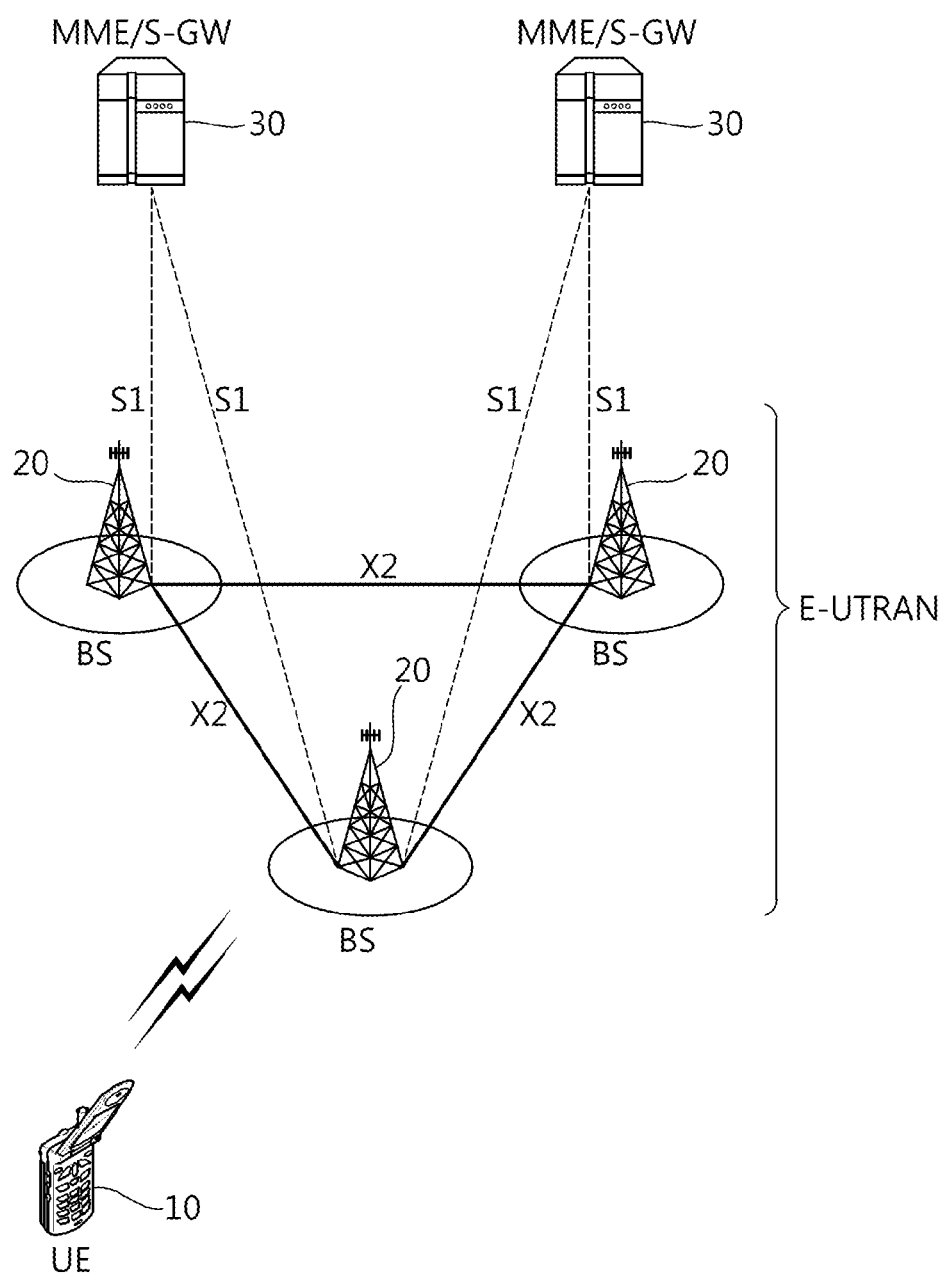
FIG. 1 illustrates a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
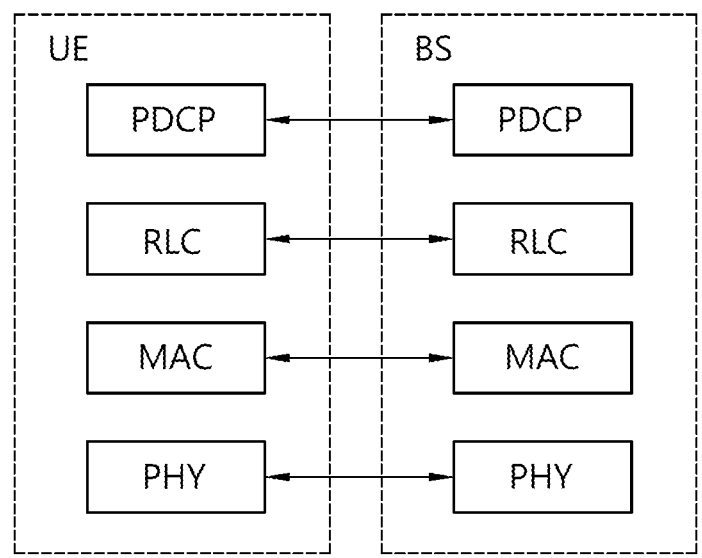
FIG. 2 is a block diagram showing the structure of a wireless protocol on the user plane.
Figure 3:
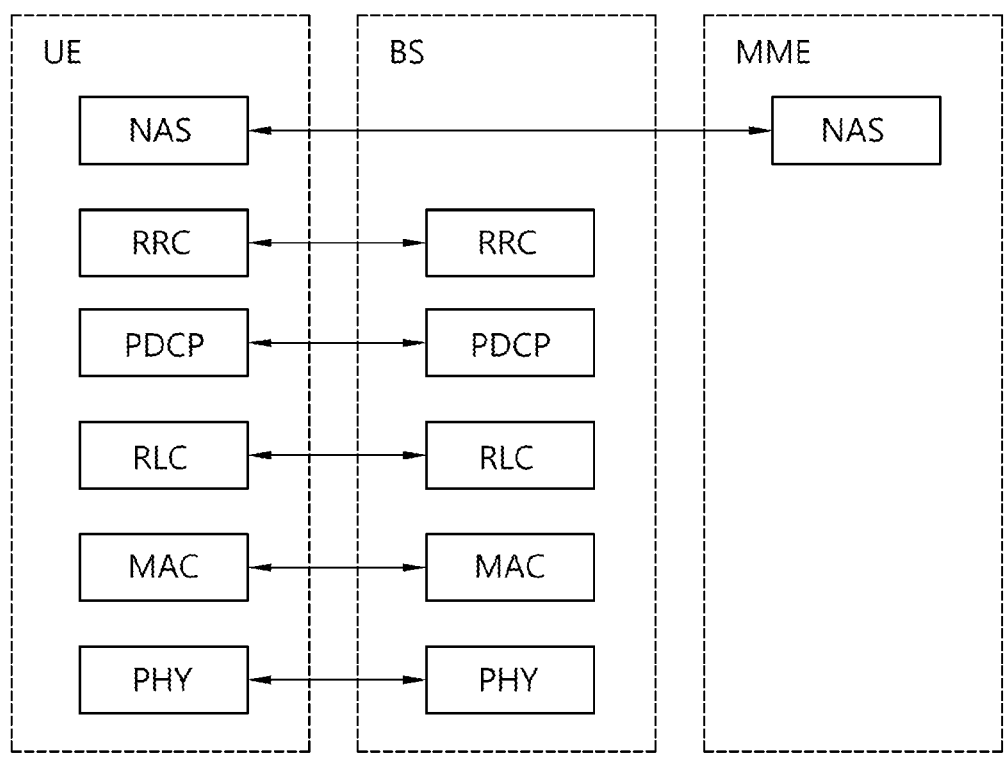
FIG. 3 is a block diagram showing the structure of a wireless protocol on the control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

As disclosed in 3GPP TS 36.211 V8.7.0, a physical channel in a 3GPP LTE may be divided into a PDSCH (Physical Downlink Shared Channel) and a PUSCH (Physical Uplink Shared Channel) being a data channel and a PDCCH (Physical Downlink Control Channel), a PCFICH (Physical Control Format Indicator Channel), a PHICH (Physical Hybrid-ARQ Indicator Channel), and a PUCCH (Physical Uplink Control Channel) being a control channel.

A PCFICH transmitted through a first OFDM symbol of a sub-frame carries a CFI (control format indicator) with respect to the number of OFDM symbols used to transmit control channels in a sub-frame. The terminal firstly receives a CFI on a PCFICH to monitor the PDCCH.

The PDCCH refers to a scheduling channel to carry schedule information as a downlink control channel. The control information transmitted through the PDCCH refers to downlink control information (DCI). The DCI may include resource allocation of the PDSCH (refers to DL grant (downlink grant)), resource allocation of the PUSCH (refers to uplink (UL) grant)), and a group and/or VoIP (Voice over Internet Protocol) of a transmission power control command with respect to individual UEs in an optional UE group.

In the 3GPP LTE, blind decoding is used to detect the PDCCH. The blind decoding de-masks a desired identifier to a CRC (Cyclic Redundancy Check) of a received PDCCH (refers to candidate PDCCH), and checks a CRC error to determine whether a corresponding PDCCH is a control channel thereof.

The base station determines a PDCCH format according to a DCI to be sent to the terminal to attach a CRC to the DCI, and masks a unique identifier (refers to RNTI (Radio Network Temporary Identifier)) according to an owner or a use of the PDCCH.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a process of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell. The system information is divided into a MIB (Master Information Block) and a plurality of SIBs (System Information Blocks).

The MIB may include a limited number of parameters which are most frequently transmitted and are required for acquisition for other information from a cell. The terminal firstly searches the MIB after downlink synchronization. The MIB may include information such as a downlink channel bandwidth, PHICH configuration, an SFN to support synchronization and to be operated as a timing reference, and eNB transmission antenna configuration. The MIB may be broadcasted on the BCH.

A SIB1 (SystemInformationBlockType1) among SIBs is transmitted while being included in a SystemInformationBlockType1", and other SIBs except for the SIB1 is transmitted while being included in the system information message. The SIBs may be flexibly mapped to the system information message according to a scheduling information list parameter included in the SIB1. However, each SIB is included in a single system information message, and only SIBs having the same scheduling required value (e.g. period) may be mapped to the same system information message. Further, a SIB2 (SystemInformationBlockType2) is mapped to a system information message corresponding to a first entry in a system information message list of a scheduling information list. A plurality of system information messages may be transmitted within the same time period. The SIB1 and all system information messages are transmitted on a DL-SCH.

Further to broadcast transmission, the E-UTRAN may be dedicated-signaled in a state that the SIB1 includes the same parameter as a preconfiguration value. In this case, the SIB1 may be transmitted while being included in a RRC connection reconfiguration message.

The SIB1 includes information on terminal cell access, and defines scheduling of other SIBs. The SIB1 may include PLMN identifiers of a network, a TAC (Tracking Area Code), a cell ID, a cell barring status to indicate whether a cell may camp-on, the lowest reception level required in a cell used as a cell reselection reference, and information on a transmission time and a time period of other SIBs.

The SIB2 may include radio resource configuration information common in all terminals. The SIB2 may include a uplink carrier frequency, an uplink channel bandwidth, RACH configuration, paging configuration, uplink power control configuration, sounding reference signal configuration, PUCCH configuration and PUSCH configuration supporting ACK/NACK transmission.

The terminal may apply acquisition and change sensing procedures of system information with respect to only a PCell. In the SCell, the E-UTRAN may provide all system information on the RRC connection state operation through dedicated signaling when a corresponding SCell is added. When system information on the configured SCell is changed, the E-UTRAN may release a considered SCell and may add the considered SCell later, which may be performed together with a single RRC connection reconfiguration message. The E-UTRAN may configure parameter values different from a value broadcasted in the considered SCell through the dedicated signaling.

The terminal should ensure validity with respect to system information of a specific type. The above system information refers to required system information. The required system information may be defined as follows.

When the terminal is in a RRC idle state: the terminal should to have a valid version of an MIB and the SIB1 as well as a SIB2 to a SIB8, which may depend on support of a considered RAT.

When the terminal is in a RRC connection state: the terminal should ensure to have valid versions of the MIB, the SIB1 and the SIB2.

In general, after the system information is acquired, validity may be ensured with a maximum three hours.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
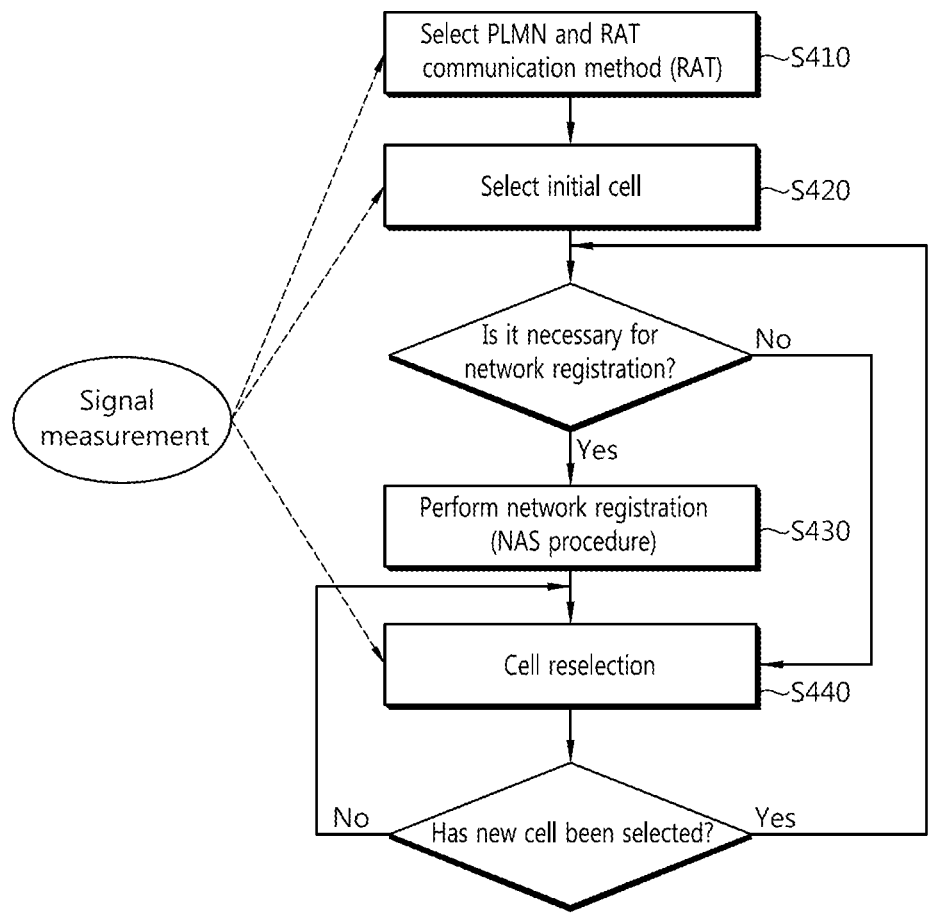
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection process, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This process is called cell reselection differently from the initial cell selection of the No. 2 process. In this case, temporal restriction conditions are placed in order for a cell to be frequently reselected in response to a change of signal characteristic. A cell reselection procedure is described later in detail.

Figure 5:
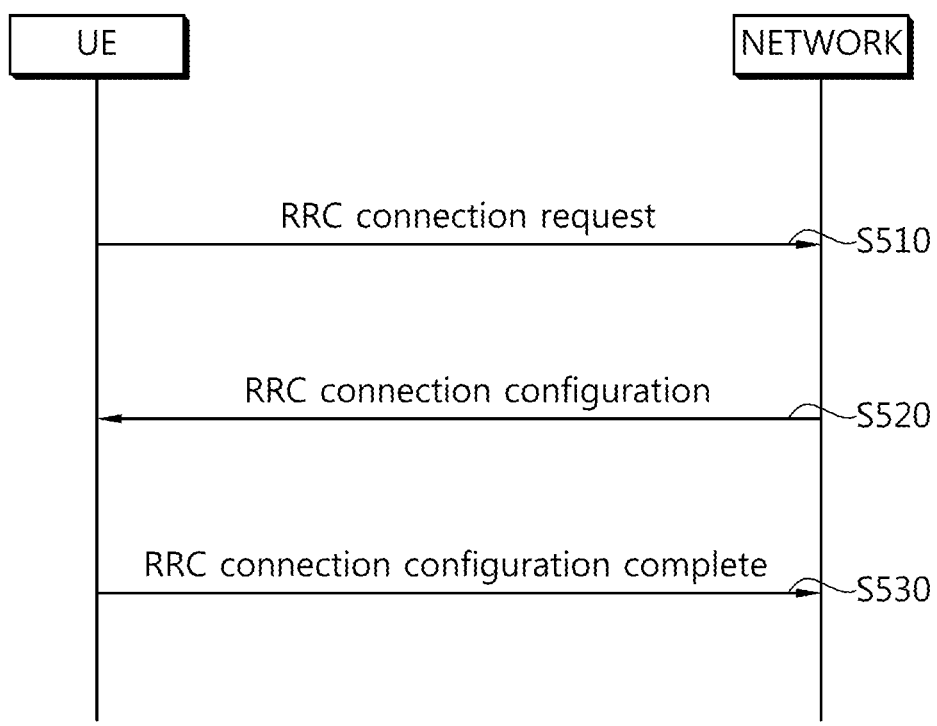
FIG. 5 is a flowchart illustrating a process of establishing RRC connection.

FIG. 5 is a flowchart illustrating a process of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
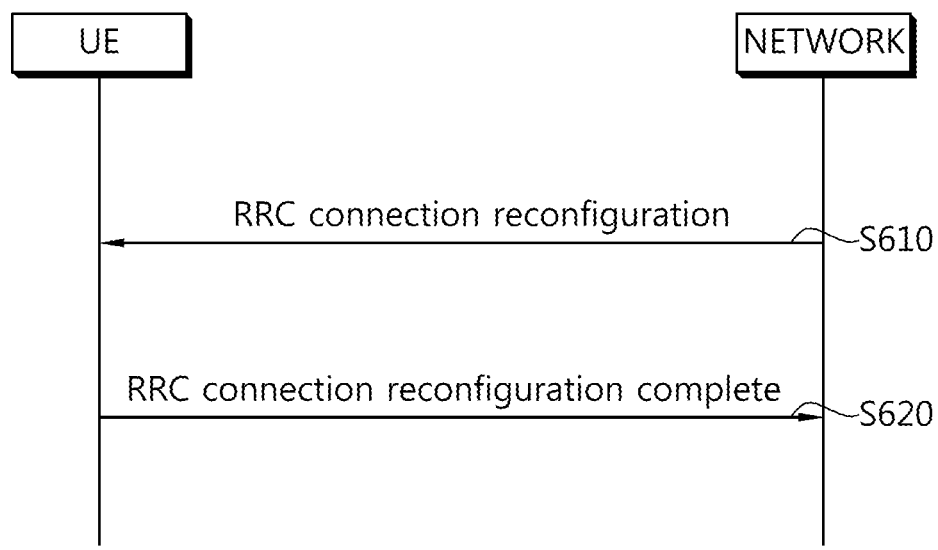
FIG. 6 is a flowchart illustrating an RRC connection reconfiguration process.

FIG. 6 is a flowchart illustrating an RRC connection reconfiguration process. An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP TS 36.304 V8.5.0 (2009-03) "User Equipment (UE) procedures in idle mode (Release 8)".

A cell selection process is basically divided into two types.

The first is an initial cell selection process. In this process, UE does not have preliminary information about a wireless channel. Accordingly, the UE searches for all wireless channels in order to find out a proper cell. The UE searches for the strongest cell in each channel. Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection process. If the UE has only to search for a cell that satisfies the cell selection criterion, the UE selects the corresponding cell. If a suitable cell that satisfies the cell selection criterion is not retrieved though such a process, the UE performs an initial cell selection process.

A cell selection reference may be defined as expressed by a following equation 1.

$$Srxlev>0 \text{ AND } Squal>0 \qquad \text{[Equation 1]}$$

where:

$$Srxlev = Q_{rxlevmeas} - (Q_{rxlevmin} + Q_{rxlevminoffset}) - Pcompensation$$

$$Squal = Q_{qualmeas} - (Q_{qualmin} + Q_{qualminoffset})$$

In this case, respective variables of the equation 1 may be defined by a following table 1.

TABLE 1

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN [5] |
| $Q_{qualminoffset}$ | Offset to the signalled $Q_{qualmin}$ taken into account in the Squal evaluation as a result of a periodic search for a higher priority PLMN while camped normally in a VPLMN [5] |
| Pcompensation | $\max(P_{EMAX} - P_{PowerClass}, 0)$ (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

Signaled values Qrxlevminoffset and Qqualminoffset are a result of periodic search with respect to a PLMN of a higher priority while the terminal camps on a normal cell in the VPLMN. During the periodic search with the PLMN having the higher priority, the terminal may perform cell selection estimation using stored parameters from other cell of the PLMN having the higher priority.

After the UE selects a specific cell through the cell selection process, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a process is called cell reselection. In general, a basic object of the cell reselection process is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection process compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection process is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency.

For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection.

For the intra-frequency or inter-frequency cell reselection, a network may provide UE with a cell reselection black list used in cell reselection. The UE does not perform cell reselection on a cell included in the black list.

Ranking performed in a cell reselection evaluation process is described below.

A ranking criterion used to apply priority to a cell is defined as in Equation 1.

$$R_s = Q_{meas,s} + Q_{hyst}, \quad R_n = Q_{meas,s} - Q_{offset} \quad \text{[Equation 1]}$$

In this case, $R_s$ is the ranking criterion of a serving cell, $R_n$ is the ranking criterion of a neighbor cell, $Q_{meas,s}$ is the quality value of the serving cell measured by UE, $Q_{meas,n}$ is the quality value of the neighbor cell measured by UE, $Q_{hyst}$ is the hysteresis value for ranking, and $Q_{offset}$ is an offset between the two cells.

In Intra-frequency, if UE receives an offset "$Q_{offset,n}$" between a serving cell and a neighbor cell, $Q_{offset} = Q_{offsets,n}$. If UE does not receive $Q_{offsets,n}$, $Q_{offset} = 0$.

In Inter-frequency, if UE receives an offset "$Q_{offset,n}$" for a corresponding cell, $Q_{offset} = Q_{offsets,n} + Q_{frequency}$. If UE does not receive "$Q_{offsets,n}$", $Q_{offset} = Q_{frequency}$.

If the ranking criterion $R_s$ of a serving cell and the ranking criterion $R_n$ of a neighbor cell are changed in a similar state, ranking priority is frequency changed as a result of the change, and UE may alternately reselect the twos. $Q_{hyst}$ is a parameter that gives hysteresis to cell reselection so that UE is prevented from to alternately reselecting two cells.

UE measures $R_s$ of a serving cell and $R_n$ of a neighbor cell according to the above equation, considers a cell having the greatest ranking criterion value to be the highest-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

In order to perform the cell reselection according to the cell reselection estimation, when the cell reselection reference is satisfied for a specific time, the terminal determines that the cell reselection reference is satisfied and may perform cell movement to a selected target cell. In this case, the specific time may be given from the network as a Treselection parameter. The Treselection may specify a cell reselection timer value, and may be defined with respect to each frequency of the E-UTRAN and other RAT.

Hereinafter, cell reselection information used for cell reselection of the terminal will be described.

The cell reselection information is a type of a cell reselection parameter and may be transmitted and provided to the terminal while being included in the system information broadcasted from the network. The cell reselection parameter provided to the terminal may include following types.

Cell reselection priority cellReselectionPriority: The cellReselectionPriority parameter specifies a priority with respect to a frequency of the E-UTRAN, a frequency of a UTRAN, a group of GERAN frequencies, a band glass of a CDMA2000 HRPD or a band glass of a CDMA2000 1×RTT.

$Qoffset_{s,n}$: specifies an offset value between two cells.

$Qoffset_{frequency}$: specifies frequency specific offset with respect to an E-UTRAN frequency having the same priority.

$Q_{hyst}$: specifies a hysteresis value with respect a rank index.

$Q_{qualmin}$: specifies a required minimum quality level in a dB unit.

$Q_{rxlevmin}$: specifies a required minimum Rx in a dB unit.

$Treselection_{EUTRA}$: may specify a cell reselection timer value for the E-UTRAN, and may be configured with respect to each frequency of the E-UTRAN.

$Treselection_{UTRAN}$: specifies a cell reselection timer value for the UTRAN.

$Treselection_{GERA}$: specifies a cell reselection timer value for the GERAN.

$Treselection_{CDMA\_HRPD}$: specifies a cell reselection timer value for CDMA HRPD.

$Treselection_{CDMA\_1\times RTT}$: specifies a cell reselection timer value for CDMA 1×RTT.

$Thresh_{x,HighP}$: specifies a Srxlev threshold value used by a terminal upon cell reselection to an RAT/frequency having a priority higher than a serving frequency. A specific threshold value may be independently configured with respect to each frequency of the E-UTRAN and the UTRAN, each group of a GERAN frequency, each band glass of CDMA2000 HRPD and each band glass of CDMA2000 1×RTT.

$Thresh_{x,HighQ}$: When cell reselection to RAT/frequency having a priority higher than the serving frequency is performed, a Squal threshold value used by a terminal is specified in a dB unit. The specific threshold value may be independently configured with respect to each frequency of the E-UTRAN and a UTRAN FDD.

$Thresh_{x,LowP}$: When cell reselection to RAT/frequency having a priority lower than the serving frequency is performed, a Srxlev threshold value used by a terminal is specified in a dB unit. The specific threshold value may be independently configured with respect to each frequency of the E-UTRAN and a UTRAN FDD, each group of a GERAN frequency, each band glass of a CDMA2000 HRPD and each band glass of CDMA2000 1×RTT.

$Thresh_{x,LowQ}$: When cell reselection to RAT/frequency having a priority lower than the serving frequency is performed, a Squal threshold value used by a terminal is specified in a dB unit. The specific threshold value may be independently configured with respect to each frequency of the E-UTRAN and a UTRAN FDD.

$Thresh_{Serving,LowP}$: When cell reselection to RAT/frequency having a priority lower than the serving frequency is performed, a Srxlev threshold value used by a terminal is specified in a dB unit.

$Thresh_{Serving,LowQ}$: When cell reselection to RAT/frequency having a priority lower than the serving frequency is performed, a Squal threshold value used by a terminal is specified in a dB unit.

$S_{IntraSerachP}$: specifies a Srxlev threshold value with respect to intra-frequency measurement in a dB unit.

$S_{IntraSerachQ}$: specifies a Squal threshold value with respect to intra-frequency measurement in a dB unit.

$S_{nonIntraSerachP}$: specifies E-UTRAN inter-frequency and a Srxlev threshold value with respect to inter-RAT measurement.

$S_{nonIntraSerachQ}$: specifies E-UTRAN inter-frequency and a Squal threshold value with respect to E-UTRAN inter-frequency and inter-RAT measurement.

Meanwhile, the cell reselection information may be provided while being included in a RRC connection release message which is a RRC message transmitted for RRC connection release between the network and the terminal. For example, the RRC connection release message may include a sub-carrier frequency list and cell reselection priority of the E-UTRAN, a sub-carrier frequency list and cell reselection priority of the UTRA-FDD, a sub-carrier frequency list and cell reselection priority of the UTRA-TDD, a sub-carrier frequency list and cell reselection priority of the GERAN, a band glass list and cell reselection priority of the CDMA2000 HRPD, and a band glass list and cell reselection priority of CDMA2000 1×RTT.

Hereinafter, the sharing of an RAN by a plurality of service providers is described.

A plurality of service providers may individually construct RANs and provide services, but may provide subscribers with services by sharing a cell constructed by a specific service provider. This is called the sharing of an RAN. In this case, a cell shared by a plurality of service providers may broadcast a PLMN list. The PLMN list may be included in the SIB1 of system information broadcasted by the cell and transmitted. Meanwhile, in the PLMN list included in the SIB1, the first listed PLMN identifier may be implemented to indicate a primary PLMN.

Cell reselection information provided by a single cell shared in the situation in which the single cell is shared by a plurality of service providers may be applied to all PLMNs within a PLMN list in common Cell reselection information provided by a cell that is shared in common is configured to chiefly comply with the policy of a main PLMN. Accordingly, UEs provided with services according to secondary PLMNs perform cell reselection based on information not cell reselection information optimized for service provision.

Handover related to the movement of UE in an RRC-connected state is described below.

Figure 7:
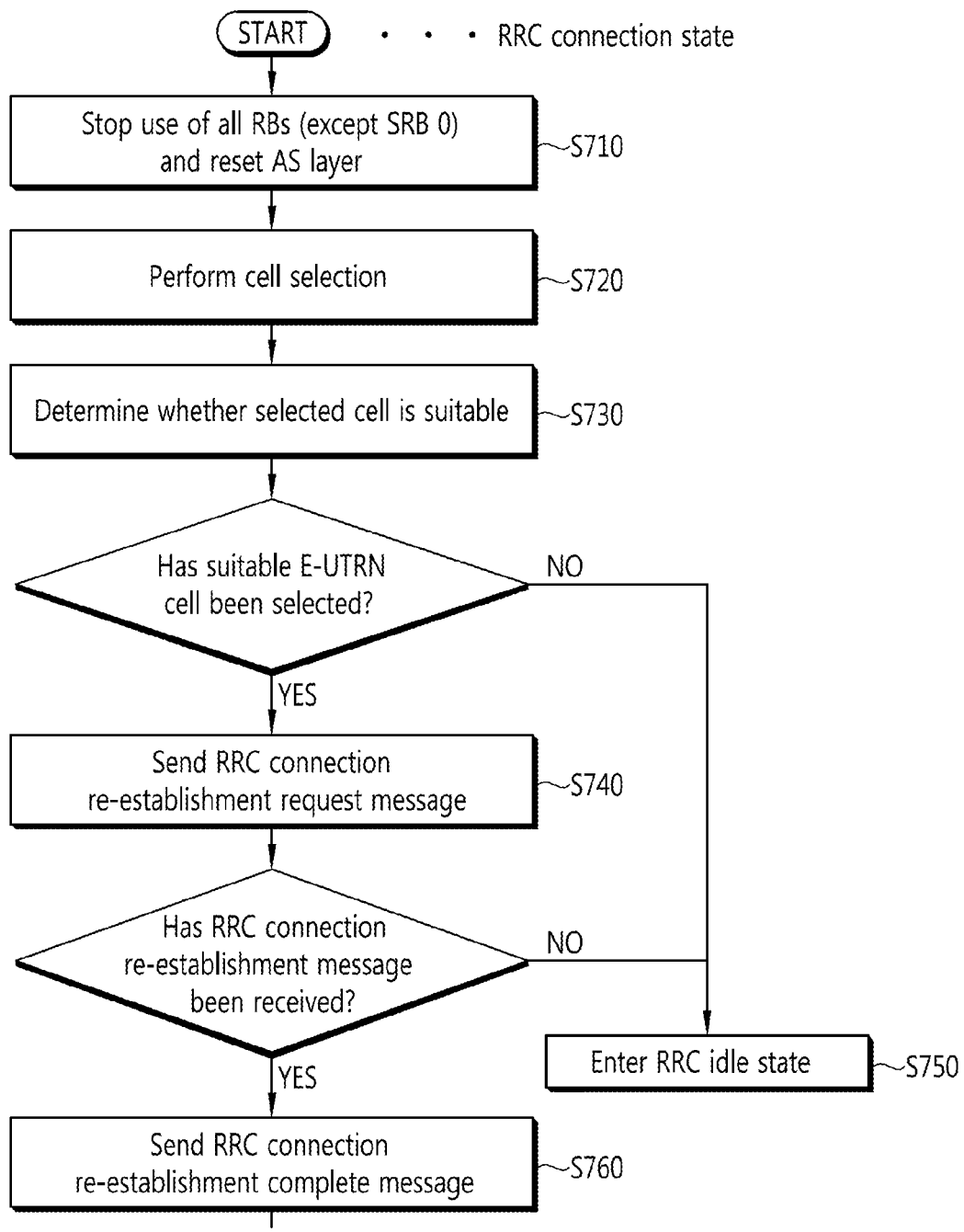
FIG. 7 is a flowchart illustrating a handover process.

FIG. 7 is a flowchart illustrating a handover process.

UE sends a measurement report to a source BS (S710). The source BS determines whether or not to perform handover using the received measurement report. If the source BS determines to perform handover to a neighbor cell, a neighbor cell becomes a target cell, and a BS belonging to the target cell becomes a target BS.

The source BS sends a handover preparation message to the target BS (S711). The target BS performs admission control in order to increase the success possibility of the handover.

The target BS sends a handover preparation acknowledgement (ACK) message to the source BS (S712). The handover preparation ACK message may include a cell-radio network temporary identifier (C-RNTI) and/or a dedicated random access preamble. The C-RNTI is an identifier for distinguishing UE within a cell. The dedicated random access preamble is a preamble that may be exclusively used by UE for a specific period and is used when a non-contention-based random access process is performed. A random access process may be divided into a contention-based random access process in which UE uses a specific random access preamble and a non-contention-based random access process in which UE uses a dedicated random access preamble. The non-contention-based random access process can prevent the delay of handover attributable to a contention with other UEs compared to the contention-based random access process.

The source BS sends a handover command message to the UE (S713). The handover command message may be transmitted in the form of a radio resource control (RRC) connection reconfiguration message. The handover command message may include a C-RNTI and a dedicated random access preamble received from the target BS.

After receiving the handover command message from the source BS, the UE is synchronized with the target BS (S714). The UE receives the PSS and SSS of the target BS, synchronizes the PSS and the SSS, receives a PBCH, and obtains system information.

The UE starts a random access process by sending a random access preamble to the target BS (S715). The UE may use the dedicated random access preamble included in the handover command message. Alternatively, if the dedicated random access preamble has not been allocated, the UE may use a random access preamble randomly selected from a random access preamble set.

The target BS sends a random access response message to the UE (S716). The random access response message may include uplink resource allocation and/or timing advance.

The UE that has received the random access response message coordinates uplink synchronization based on the timing advance and sends a handover confirmation message to the target BS using the uplink resource allocation (S717). The handover confirmation message indicates that the handover process has been completed, and may be transmitted along with an uplink buffer status report.

The target BS notifies a mobility management entity (MME) that the cell of the UE has been changed by sending a path switch request message to the MME (S718).

The MME sends a user plane update request message to a serving-gateway (S-GW) (S719).

The S-GW switches a downlink data path to the target BS (S720).

The S-GW sends a user plane update response message to the MME (S721).

The MME sends a path switch request ACK message to the target BS (S722).

The target BS notifies the source BS of the success of the handover by sending resource release message to the source BS (S723).

The source BS releases resources related to the UE (S724).

Hereinafter, radio link monitoring (RLM) will be described.

The terminal monitors downlink quality based on a cell-specific reference signal in order to detect downlink radio link quality of a PCell. The terminal estimates the downlink radio link quality for the purpose of monitoring downlink radio link quality of the PCell and compares the estimated downlink radio link quality with threshold values Qout and Qin. The threshold values Qout is defined as a level at which a downlink radio link may not be received, which corresponds to a 10% block error rate of hypothetical PDCCH transmission by taking into consideration a PDFICH error. The threshold value Qin is defined as a downlink radio link quality level which may be stable more than a level of the threshold value Qout, which corresponds to a 2% block error rate of hypothetical PDCCH transmission by taking into consideration the PCFICH error.

A Radio Link Failure (RLF) is described below.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

A case where UE determines that there is a serious problem in the quality of a downlink communication link (a case where the quality of a PCell is determined to be low while performing RLM) based on the radio quality measured results of the PHY layer of the UE A case where uplink transmission is problematic because a random access procedure continues to fail in the MAC sublayer.

A case where uplink transmission is problematic because uplink data transmission continues to fail in the RLC sublayer.

A case where handover is determined to have failed.

A case where a message received by UE does not pass through an integrity check.

An RRC connection re-establishment procedure is described in more detail below.

Figure 8:
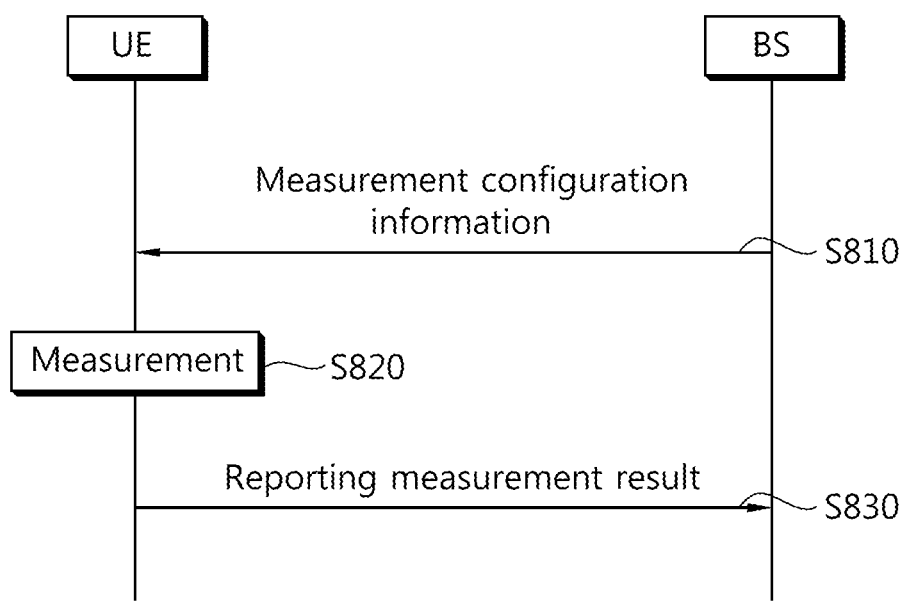
FIG. 8 is a diagram illustrating an RRC connection re-establishment procedure.

FIG. 8 is a diagram illustrating an RRC connection re-establishment procedure.

Referring to FIG. 8, UE stops using all the radio bearers that have been configured other than a Signaling Radio Bearer (SRB) #0, and initializes a variety of kinds of sublayers of an Access Stratum (AS) (S810). Furthermore, the UE configures each sublayer and the PHY layer as a default configuration. In this process, the UE maintains the RRC connection state.

The UE performs a cell selection procedure for performing an RRC connection reconfiguration procedure (S820). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S830). If the selected cell is determined to be a suitable E-UTRAN cell, the UE sends an RRC connection re-establishment request message to the corresponding cell (S840).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S850).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S860).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Measurements and a measurement report are described below.

The support of the mobility resources of UE in a mobile communication system is essential. Accordingly, UE continues to measure quality of a serving cell now providing service and quality of a neighbor cell. The UE reports measured results to a network on a proper time, and the network provides the UE with optimal mobility through handover. Measurement for such a purpose is commonly called radio resource management (RRM) measurement.

In order to provide information which may be helpful for a service provider in operating a network in addition to the purpose of a mobility support, UE may perform measurement for a specific purpose set by a network and report measured results to the network. For example, UE receives broadcast information of a specific cell determined by a network. UE may report the cell identity of a specific cell) (this is also called a global cell identity), information about the identity of a location to which the specific cell belongs (e.g., tracking area code) and/or other cell information (e.g., whether the UE is a member of a closed subscriber group (CSG) cell) to a serving cell.

If UE in motion checks that quality of a specific area is very poor through measurements, the UE may report information about the locations of cells having poor quality and measured results to a network. A network may attempt the optimization of the network based on reports on the measured results of UEs which help the operation of the network.

In a mobile communication system in which a frequency reuse factor is 1, mobility is chiefly performed between different cells in the same frequency band. Accordingly, in order to guarantee the mobility of UE, the UE needs to be able to well measure quality of neighboring cells having the same center frequency as the center frequency of a serving cell and cell information. As described above, the measurement of a cell having the same center frequency as the center frequency of a serving cell is called intra-frequency measurement. UE performs intra-frequency measurement and reports measured results to a network on a proper time so that the purpose of corresponding measured results is achieved.

A mobile communication service provider may manage a network using a plurality of frequency bands. If the service of a communication system is provided through a plurality of frequency bands, in order to guarantee optimal mobility for UE, the UE needs to be able to well measure quality of neighboring cells having center frequencies different from the center frequency of a serving cell and cell information. As described above, the measurement of a cell having a different center frequency from a serving cell is called inter-frequency measurement. UE needs to be able to perform inter-frequency measurement and to report measured results to a network on a proper time.

If UE supports measurement for a network based on a different RAT, the UE may perform a cell of a corresponding network through a BS configuration. Such measurement is called inter-radio access technology (RAT) measurement. For example, an RAT may include an UMTS terrestrial radio access network (UTRAN) and a GSM edge radio access network (GERAN) which comply with a 3GPP standard and may also include a CDMA 2000 system complying with a 3GPP2 standard.

Figure 9:
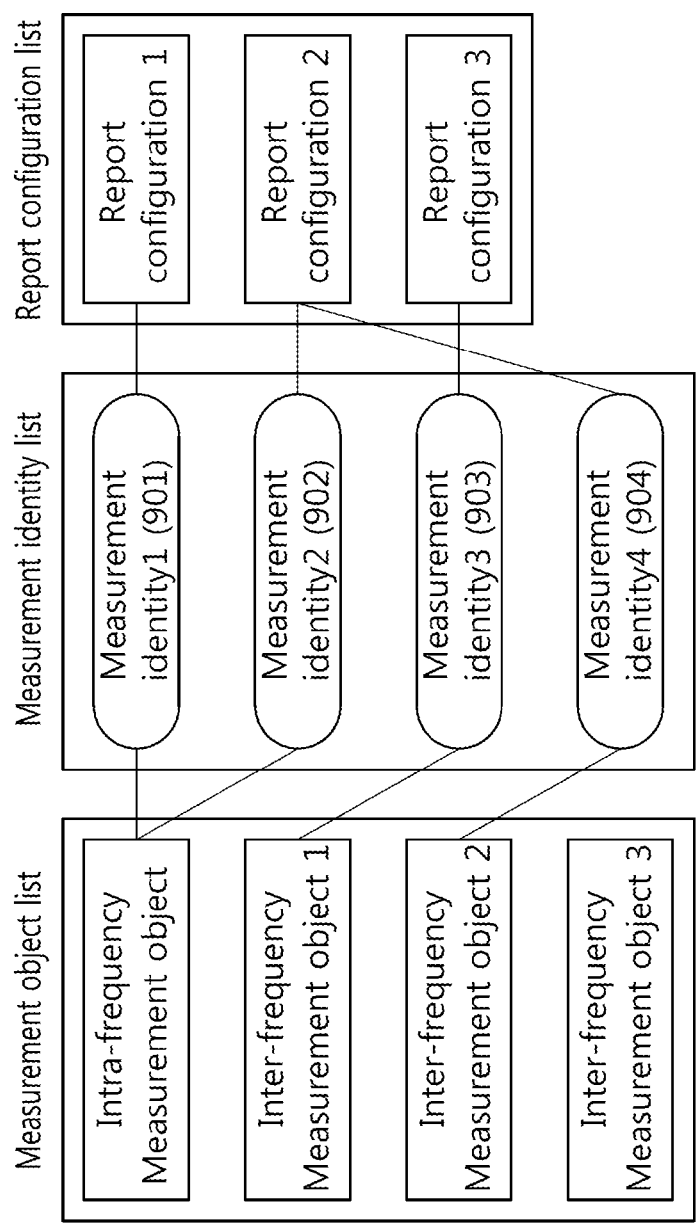
FIG. 9 is a flowchart illustrating a measuring method according to the related art.

FIG. 9 is a flowchart illustrating a measuring method according to the related art.

The terminal receives measurement configuration information from a base station (S910). A message including measurement configuration information refers to a measurement configuration message. The terminal performs measurement based on the measurement configuration information (S920). If the measurement result satisfies a report condition in the measurement configuration information, the terminal reports the measurement result to the base station (S930). A message including the measurement result refers to a measurement report message.

The measurement configuration information may include following information.

(1) Measurement object information: represents information on an object to be measured by the terminal. The measurement object includes at least one of an intra-frequency measurement object being a measurement object in a cell, an inter-frequency measurement object being a measurement object between cells, and an inter-RAT measurement object being an inter-RAT measurement object. For example, the inter-frequency measurement object may indicate a neighboring cell having the same frequency band as that of the serving cell, the inter-frequency measurement object may indicate a neighboring cell having a frequency band different from that of the serving cell, and an inter-RAT measurement object may indicate a neighboring cell of a RAT different from that of the serving cell.

(2) Reporting configuration information: represents information on a reporting condition and a reporting type when transmission of the measurement result is reported. The reporting configuration information may be configured as a list of reporting configuration. Each reporting configuration may include a reporting criterion and a reporting format. The reporting criterion is a criterion triggering transmission of the measurement result by the terminal. The reporting criterion may include a period of a measurement reporting or a single event for the measurement reporting. The reporting format is information on which type the terminal configures the measurement result.

(3) Measurement identity information: represents information on a measurement identity to determine when the terminal reports a certain measurement object as a certain type by associating the measuring reporting with reporting configuration. The measurement identity information is included in the measurement reporting message, which may represent which measurement object is the measurement result and in which reporting condition the measurement reporting is generated.

(4) Quantity configuration information: represents information on a parameter for configuring filtering of a measurement unit, a reporting unit, and/or a measurement result value.

(5) Measurement gap information: represents information on a measurement gap which is an interval when the terminal may use for measurement without considering data transmission with the serving cell because downlink transmission or uplink transmission is not scheduled.

The terminal has a measurement object list, a measurement reporting configuration list, and a measurement identity list in order to perform a measurement procedure.

In the 3GPP LTE, the base station may configure only one measurement object with respect to one frequency band to the terminal. According to section 5.5.4 of 3GPP TS 36.331 V8.5.0 (2009-03) "Evolved Universal Terrestrial Radio Access (E-UTRA) Radio Resource Control (RRC); Protocol specification (Release 8)", events resulting in the measurement reporting as listed in a following table 2 are defined.

TABLE 2

| Events | Reporting conditions |
|---|---|
| Event A1 | Serving becomes better than threshold |
| Event A2 | Serving becomes worse than threshold |
| Event A3 | Neighbour becomes offset better than serving |
| Event A4 | Neighbour becomes better than threshold |
| Event A5 | Serving becomes worse than threshold1 and neighbour becomes better than threshold2 |
| Event B1 | Inter RAT neighbour becomes better than threshold |
| Event B2 | Serving becomes worse than threshold1 and inter RAT neighbour becomes better than threshold2 |

If the measurement result of the terminal satisfies the configured event, the terminal transmits a measurement reporting message to the base station.

Figure 10:
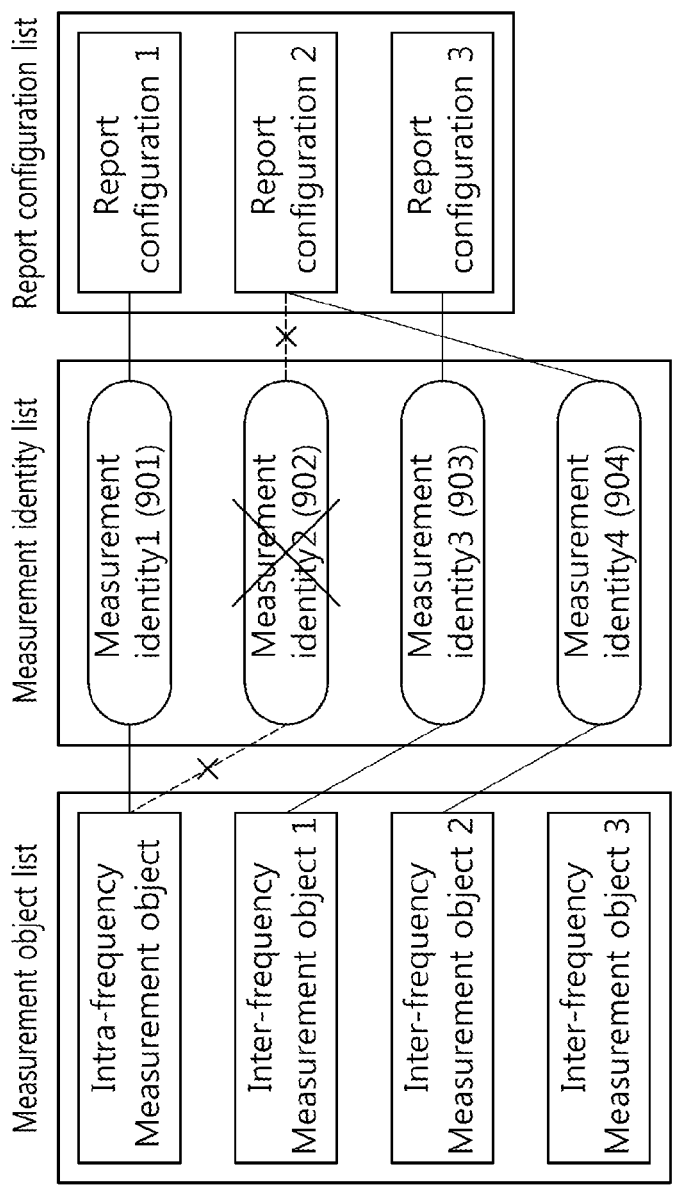
FIG. 10 illustrates an example of measurement configuration in the terminal.

FIG. 10 illustrates an example of measurement configuration in the terminal.

First, the measurement identity 1 (1001) connects an intra-frequency measurement object with a reporting configuration 1. The terminal performs intra frequency measurement, and the reporting configuration 1 is used to determine criterion and type of the measurement result reporting.

As in the measurement identity 1 (1001), the measurement identity 2 (1002) is connected to the intra-frequency measurement object, but connects the intra-frequency measurement object to the reporting configuration 2. The terminal performs measurement and the reporting configuration 2 is used to determine criterion and type of the measurement result reporting.

According to a measurement identity 1 (1001) and a measurement identity 2 (1002), even if a measurement result with respect to the intra-frequency measurement object satisfies one of reporting configuration 1 and reporting configuration 2, the terminal transmits the measurement result.

The measurement identity 3 (1003) connects the inter-frequency measurement object 1 to the reporting configuration 3. If the measurement result with respect to the inter-frequency measurement object 1 satisfies a reporting condition included in the reporting configuration 1, the terminal reports the measurement result.

The measurement identity 4 (1004) connects the inter-frequency measurement object 2 to the reporting configuration 2. If the measurement result with respect to the inter-frequency measurement object 2 satisfies a reporting condition included in the reporting configuration 2, the terminal reports the measurement result.

Meanwhile, the measurement object, reporting configuration and/or measurement identity may be added, changed, and/or removed. This may be indicated by sending a new measurement configuration message or the measurement configuration change message to the terminal.

Figure 11:
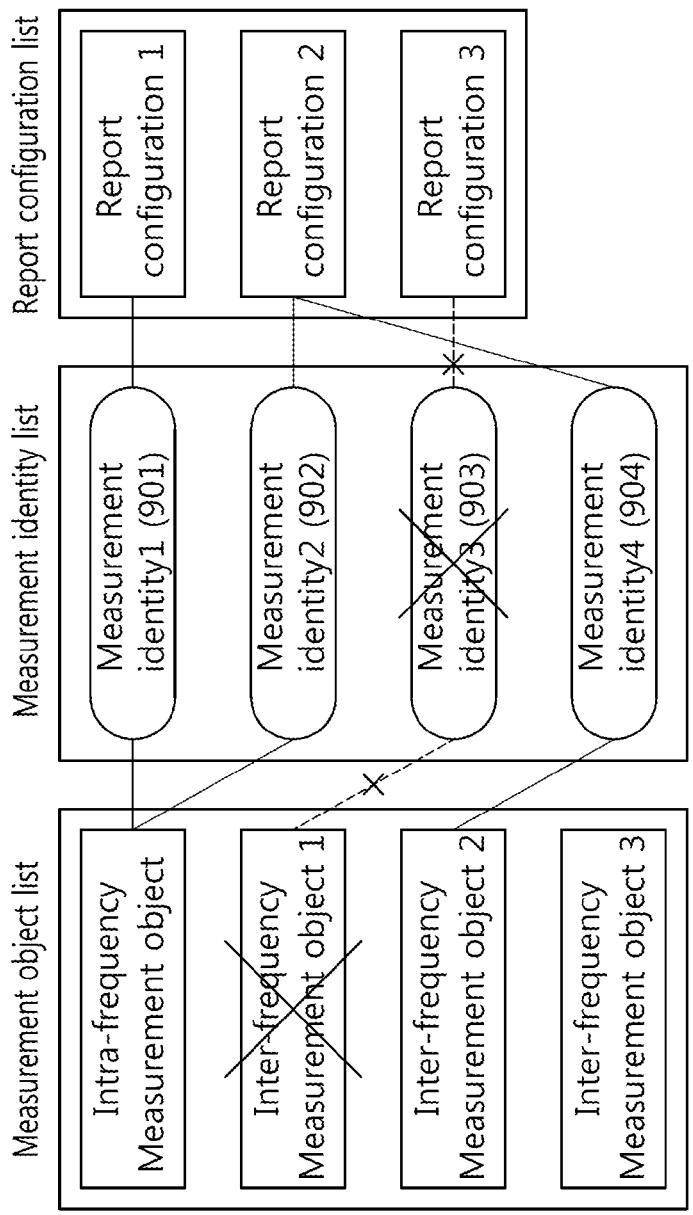
FIG. 11 illustrates an example of removing the measurement identity.

FIG. 11 illustrates an example of removing the measurement identity. If the measurement identity 2 (1002) is removed, measurement with respect to a measurement object associated with the measurement identity 2 (1002) is stopped and the measurement reporting is not transmitted. The measurement object associated with the removed measurement identity or the reporting configuration may not be changed.

Figure 12:
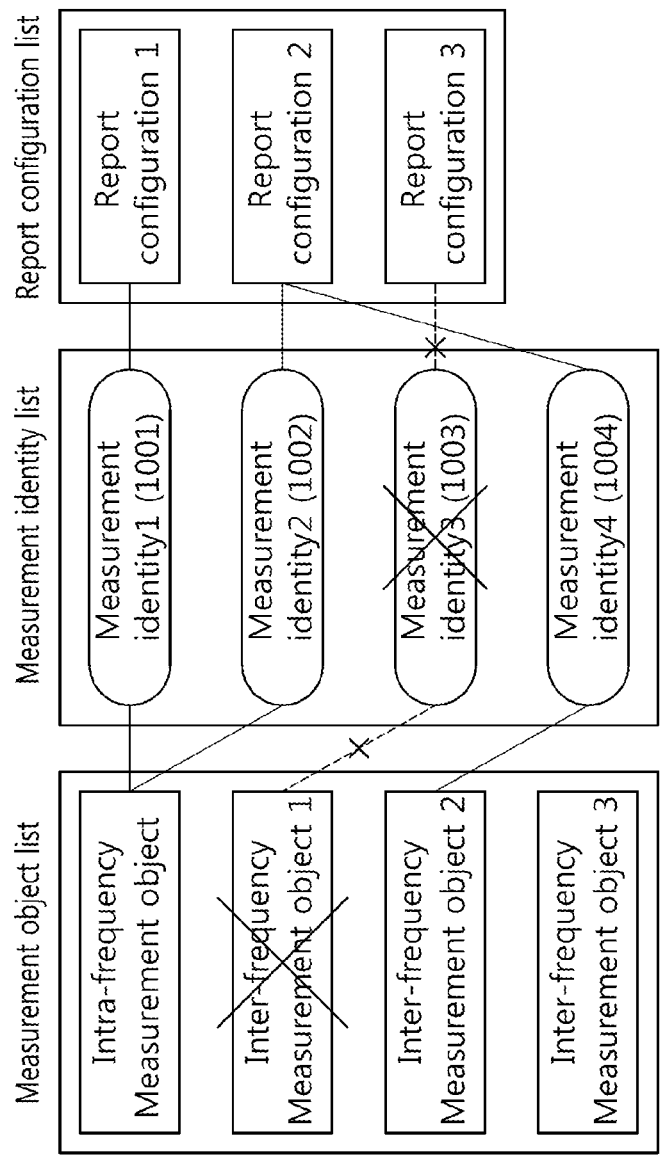
FIG. 12 illustrates an example of removing the measurement object.

FIG. 12 illustrates an example of removing the measurement object. If the inter-frequency measurement object 1 is removed, the terminal also remove the measurement identity 3 (1003) associated with the inter-frequency measurement object 1. Measurement with respect to the inter-frequency measurement object 1 is stopped and the measurement reporting is not transmitted. However, the reporting configuration associated with the remove inter-frequency measurement object 1 may not be changed or removed.

If the reporting configuration is removed, the terminal also removes a measurement identity associated with the reporting configuration. The terminal stops measurement with respect to the measurement object associated with the associated measurement identity. However, the measurement object associated with the removed reporting configuration may not be changed or removed.

The measurement reporting may include a measurement identity, measured quality of the serving cell and a measurement result of the neighboring cell. The measurement identity identifies a measurement object to which the measurement report is triggered. The measurement result of the neighboring cell may include a cell identity and measured quality of the neighboring cell. The measured quality may include at least one of Reference Signal Received Power (RSRP) and Reference Signal Received Quality (RSRQ).

A carrier aggregation scheme supported in a wireless communication system is described below.

LTE-A is an IMT-advanced candidate technology of the International Telecommunication Union (ITU) and has been designed to comply with IMT-Advanced technology requirements of the ITU. Accordingly, in LTE-A, in order to satisfy the requirements of the ITU, the extension of a bandwidth compared to an existing LTE system is in discussion.

Figure 13:
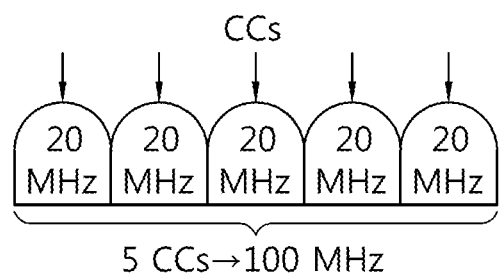
FIG. 13 is a diagram showing an example of a carrier aggregation scheme.

FIG. 13 is a diagram showing an example of a carrier aggregation scheme.

In order to extend a bandwidth in an LTE-A system, a carrier present in an existing LTE system is defined as a component carrier (CC). The use of a maximum of such 5 CCs is in discussion. If 5 CCs are used, a bandwidth can be extended up to a maximum bandwidth of 100 MHz because a CC can have a maximum bandwidth of 20 MHz as in an LTE system. The use of a plurality of CCs as described above is called a carrier aggregation scheme.

From a logical viewpoint of radio source used by UE, to additionally configure a CC for a carrier aggregation may be similar to the case where an additional serving cell is configured for the UE in addition to an existing serving cell. That is, configuring a plurality of CCs for UE is logically similar to configuring a plurality of serving cells for the UE. UE may be provided with a service from a plurality of serving cells. The original serving cell may be said to be a PCell, and a cell for a carrier aggregation may be said to be an SCell. Accordingly, an additionally configured CC may also be represented as an SCell, that is, an additionally configured serving cell.

For communication operation through a carrier aggregation, UE may need to obtain information about an SCell for the carrier aggregation from a network. Carrier aggregation configuration information may include system information about a CC (system information about a cell that may be configured as an SCell) and parameter information related to a variety of types of other CC operations.

In order for a network to additionally configure a serving cell for UE, an RRC connection re-configuration procedure may be used. The network may include carrier aggregation configuration information, including information about an SCell to be additionally configured, in an RRC connection re-configuration message and send the RRC connection re-configuration message to the UE. The UE which has received the RRC connection re-configuration message may be provided with a serving cell additionally configured through the carrier aggregation configuration information and may perform communication based on the serving cell.

Meanwhile, a change of a serving cell and the removal of a serving cell in addition to the addition of a serving cell may be performed through an RRC connection re-configuration procedure.

In a configuration for a carrier aggregation in UE, the activation/deactivation mechanism of an SCell may be supported in order to enable rational UE battery consumption. In this case, the activation or deactivation of a PCell in the carrier aggregation is not applied. If an SCell is deactivated, UE may not perform corresponding uplink transmission or does not need to perform CQI measurement because it does not need to receive a corresponding PDCCH and/or PDSCH. In contrast, if an SCell is activated, UE needs to receive a PDSCH and a PDCCH (if the UE has been configured to monitor a PDCCH from a corresponding SCell) and may be expected to perform CQI measurement.

Such an SCell activation/deactivation mechanism may be based on MAC control elements and deactivation timers. The MAC control elements include a bitmap for the activation and deactivation of SCells. A bit set to '1' indicates that a corresponding SCell is activated, and a bit set to '0' indicates that a corresponding SCell is deactivated. SCells may be individually activated and deactivated along with a bitmap. A single activation/deactivation indication may be indicative of the activation/deactivation of a set of some SCells of SCells. The deactivation timer is maintained for each SCell, but may be set as a common value for each UE through RRC.

In an RRC connection re-configuration procedure not related to handover (if an RRC connection re-configuration message not including mobility control information is received), an SCell may be initially deactivated and added to a serving cell set. Furthermore, the activation set of SCells present in the serving cell set is not changed.

In an RRC connection re-configuration procedure according to handover (if an RRC connection re-configuration message including mobility control information is received), SCells are deactivated.

In addition to a carrier aggregation, a plurality of cells having the same frequency may be configured for UE. For example, a macro cell and a small cell in the same frequency may be configured for UE. UE may try to perform stable mobility performance of the UE, the improvement of the data rate of the UE, and the load balancing of a network using a method of sending and receiving mobility-related configuration information, other configuration information, and user data, if necessary, through a macro cell and a method of sending and receiving user data chiefly through a small cell. If both a macro cell and a small cell are configured for UE, a cell (e.g., a macro cell) which chiefly receives mobility-related configuration information and other configuration information may be considered to be a PCell, and a small cell (e.g., a femto cell or a pico cell) may be considered to be an SCell.

A small cell described in the present invention does not mean only a cell having a small physical size (e.g., service coverage). A macro cell described in an embodiment of the present invention may be taken into consideration as a first type cell of Table 3 below, and a small cell may be taken into consideration as a second type cell of Table 3.

TABLE 3

|  | FIRST TYPE CELL | SECOND TYPE CELL |
|---|---|---|
| Size | Large size in common (e.g., macro) | Small size in common (e.g., pico, femto) |
| PCell/non-PCell | PCell | Non-PCell |
| Transmission data type | Control plane anchoring cell (e.g., an RRC message is transferred on a cell) Transfer user data | Data offloading cell (e.g., user data is chiefly transferred on a cell) |
| Essential element | Configuration of first type cell is essentially required in order to maintain UE connection | Not essential in order to maintain UE connection. Useful for data offloading UE throughput rise is useful |
| Security function | Essential element (Primal security) | Selective element (may comply with a first type security function, Secondary security) |

If a plurality of serving cells is configured for UE as described above, configuration information may be configured so that UE is provided with a normal service from each serving cell and is able to operate. For example, UE may be provided with a measurement configuration in order to perform measurements on each serving cell and/or the frequency of a corresponding serving cell. Furthermore, UE may be provided with a bearer configuration so that it is provided with a service from a corresponding serving cell and sends and receives data. UE may operate using provided configuration information in receiving services from a plurality of serving cells.

If UE operates in connection with a plurality of serving cells, a PCell, such as a macro cell, provides a control plane function and a user plane function, but an SCell may provide only a user plane function. A PCell and an SCell configured for UE may belong to different eNBs. A PCell may provide a service through a macro eNB which provides a macro service area for stable connectivity and the stabilization of mobility performance. An SCell may provide a service through a secondary eNB which provides a service area much smaller than a macro service area in order to increase the data rate of UE. In this case, a PCell may provide UE with configuration information for the reception of a service by the UE and the operation of the UE, but an SCell may not provide configuration information for the reception of a service by the UE and the operation of the UE. Accordingly, UE may be provided with configuration information for an operation on an SCell from a PCell and may operate.

UE which configures a plurality of serving cells and operates may perform mobility between cells. For example, UE may enter the coverage of a specific cell or deviate from the coverage of an existing serving cell through an actual physical movement. When UE enters the coverage of a specific cell, it may add the corresponding cell as a new serving cell. In contrast, when UE deviates from the coverage of an existing serving cell, it may release the corresponding cell from a serving cell.

If a serving cell, that is, a PCell, such as a macro cell, is released and another macro cell is added as a serving cell, that is, a new macro cell, UE may release all configurations provided by the existing serving cell and may be provided with a new configuration from the new serving cell. In contrast, if a serving cell, that is, an SCell, such as a small cell, is released, a separate handling method needs to be proposed because a configuration related to the corresponding cell is not provided and managed by the corresponding cell.

In the present invention, a measurement configuration and a bearer configuration are taken into consideration as configurations, that is, the subject of handling according to the release of a serving cell.

Figure 14:
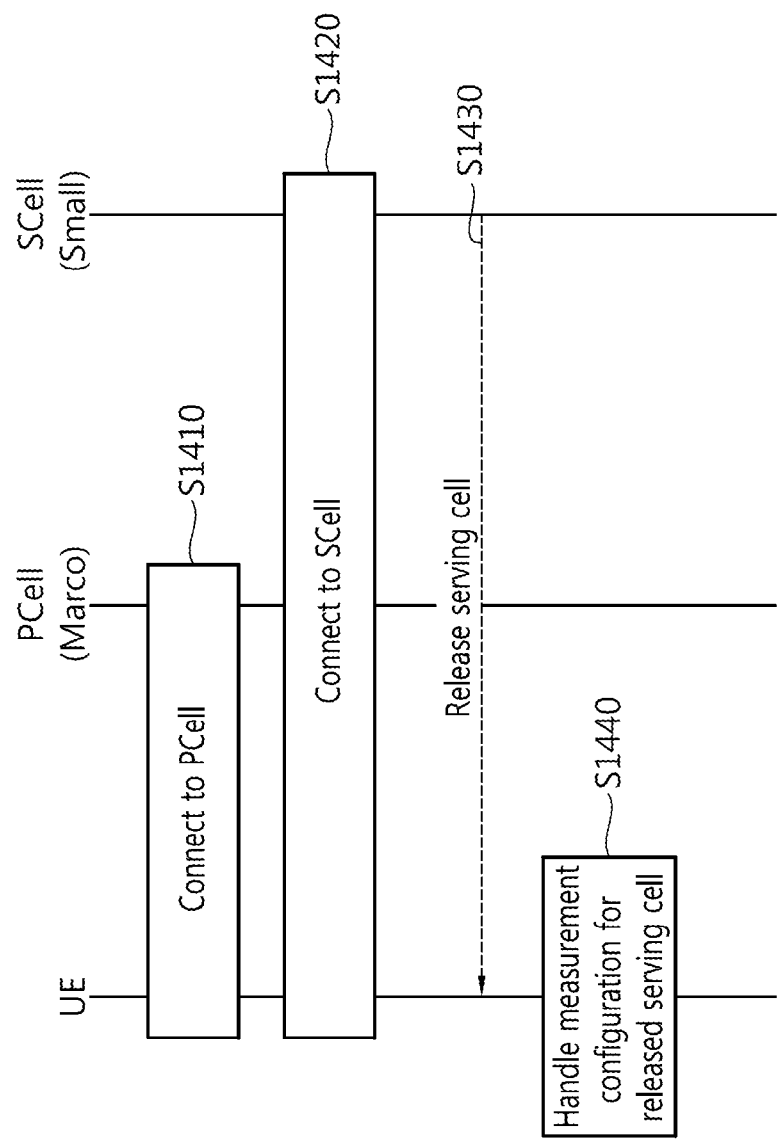
FIG. 14 a diagram showing an example of a configuration handling method according to an embodiment of the present invention.

FIG. 14 a diagram showing an example of a configuration handling method according to an embodiment of the present invention.

The example of FIG. 14 shows an example in which a measurement configuration is handled.

Referring to FIG. 14, UE may connect to a macro cell using a PCell as the macro cell (S1410). Furthermore, the UE may connect to a small cell using an SCell as the small cell within the coverage of the macro cell (S1420). As described above, the UE may configure and manage a plurality of serving cells. The UE may be provided with configuration information for an operation in the PCell and/or the SCell from the PCell. The configuration information provided by the PCell may be a measurement configuration for measurements and a report.

The UE releases the SCell from a serving cell (S1430).

The release of the serving cell may be autonomously performed by the UE. The release of the serving cell may be autonomously performed by the UE when RRC connection re-establishment is triggered. If the UE moves and deviates from the coverage of an SCell, the UE may release the SCell from a serving cell. The UE may obtain the measured results of the SCell based on a measurement configuration and may release the SCell from a serving cell if signal quality and/or signal intensity is reduced.

The release of the serving cell may be performed by the UE in response to an instruction from a network, for example, a PCell.

The UE which has released the SCell from the serving cell handles a measurement configuration for the released serving cell (S1440). When the serving cell is released, the UE may release a measurement configuration configured to measure the released serving cell and trigger a measured result report.

In the example of FIG. 14, when a serving cell is released, the UE has autonomously released a measurement configuration related to the released serving cell. For the autonomous release of the UE, a network may instruct the UE that the autonomous release of a related measurement configuration is permitted when the serving cell is released.

In the example of FIG. 14, unlike in the autonomous release of a measurement configuration by the UE, the UE may report information related to the release of an SCell when the SCell is released to a PCell. The PCell may receive information related to the release of the SCell and may instruct the UE that a measurement configuration related to the released SCell should be released. The UE may release the measurement configuration related to the released SCell in response to the instruction from the PCell.

A measurement configuration that enables a potential serving cell (e.g., a small cell) to be detected may be a measurement configuration for relaxed measurements. The relaxed measurements are performed with frequency lower than frequency of common measurements, enabling the detection of an interest cell (e.g., a small cell) and enabling measurements to be performed in an energy-efficient manner. The relaxed measurements may be measurements in which UE may be permitted to omit the use of some of measurement gaps which periodically appear. For example, the relaxed measurements may be measurements in which UE performs relaxed measurements on the inter-frequency measurement of a specific frequency. Alternatively, the relaxed measurements may be measurements of a type not having a measurement gap for a specific time after the measurement gap periodically appears for a specific time. In general, a network may instruct relaxed measurements to be performed on at least one frequency. A network may instruct UE that relaxed measurements will be performed on what frequency.

Figure 15:
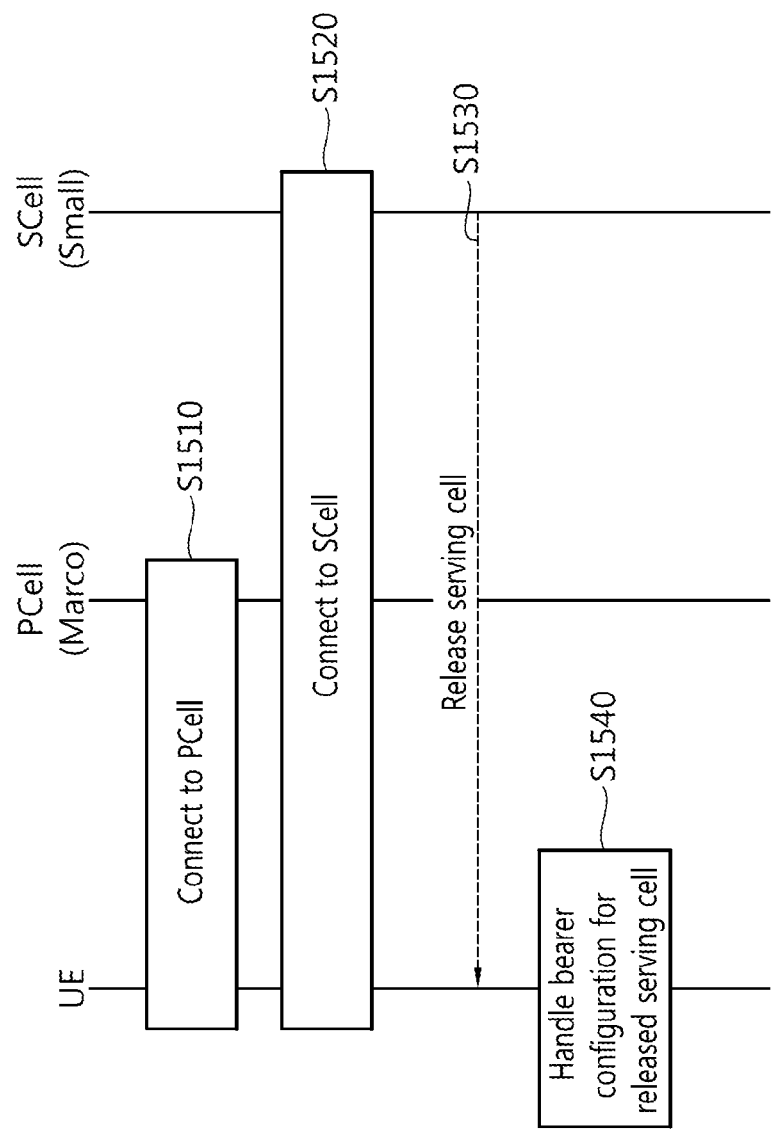
FIG. 15 is a diagram showing another example of a configuration handling method according to an embodiment of the present invention.

FIG. 15 is a diagram showing another example of a configuration handling method according to an embodiment of the present invention.

The example of FIG. 15 shows an example in which a bearer configuration is handled.

Referring to FIG. 15, UE may connect to a macro cell using a PCell as the macro cell (S1510). Furthermore, the UE may connect to a small cell using an SCell as the small cell within the coverage of the macro cell (S1520). As described above, the UE may configure and manage a plurality of serving cells. The UE may be provided with configuration information for an operation in the PCell and/or the SCell from the PCell. The configuration information provided by the PCell may be a bearer configuration for measurements and a report.

The UE releases the SCell from the serving cell (S1530).

The release of the serving cell may be autonomously performed by the UE. The release of the serving cell may be autonomously performed by the UE when RRC connection re-establishment is triggered. If the UE moves and deviates from the coverage of an SCell, the UE may release the SCell from a serving cell. The UE may obtain the measured results of the SCell based on a bearer configuration and may release the SCell from a serving cell if signal quality and/or signal intensity is reduced.

The release of the serving cell may be performed by the UE in response to an instruction from a network, for example, a PCell.

The UE which has released the SCell from the serving cell handles a bearer configuration for the released serving cell (S1540). When the serving cell is released, the UE may relocate a specific function and/or a specified configuration related to a bearer provided by the released serving cell from the SCell, that is, the released serving cell, to the PCell. Accordingly, the service continuity of the corresponding bearer may be made possible.

The relocation of a bearer by the UE may be the reassociation of radio sources configured for the use of the SCell, that is, the released serving cell, with the PCell. For example, the UE may reassociate a DRB served by the SCell, that is, the released serving cell, with the PCell. Such reassociation may cause data routing that enables data mapped to the DRB to be transferred on the PCell after the reassociation.

The reassociation of a DRB may include the reassociation of a PDCP. The reassociation of a DRB may include the reassociation of RLC. If an independent PDCP is configured for a released serving cell, reassociation may result in the association of a PDCP, configured in a PCell, with the DRB. If independent RLC is configured for a released serving cell, reassociation may result in the association of RLC, configured in a PCell, with a DRB that is taken into consideration.

If the cell release of an SCell is performed by the triggering of RRC connection re-establishment, configuration handling may be performed by UE in addition to the measurement configuration handling of FIG. 14 and the bearer configuration handling of FIG. 15. If the cell release of an SCell is performed by the triggering of RRC connection re-establishment, UE may release the radio sources of a released serving cell and a security configuration dedicated and configured for use within the released serving cell. Furthermore, if a PDCP configuration, an RLC configuration, a MAC configuration, and a PHY configuration have been configured for a released serving cell, UE may release the corresponding configurations.

Meanwhile, although RRC connection re-establishment is triggered, UE may maintain an SCell without releasing it from a serving cell. UE may maintain an SCell without releasing it from a serving cell only when a specific condition is satisfied although RRC connection re-establishment is triggered. The specific condition may include that an instruction to maintain an SCell without releasing the SCell upon RRC connection re-establishment is received from a network when the SCell is added to UE. Alternatively, the specific condition may include that an SCell of a specific type is maintained without releasing it upon RRC connection re-establishment if the SCell is added to UE. The SCell of the specific type may be a cell belonging to a secondary eNB. In this case, UE may stop the use of the corresponding SCell until it receives a restart indicator which indicates the restart of the use of the corresponding SCell or an RRC connection re-configuration message which enables the restart of the use of the corresponding SCell from a network (e.g., a PCell). The network may instruct the UE to restart the use of the corresponding SCell. The restart indicator may be transmitted to the UE when RRC connection re-establishment is successfully completed or may be transmitted to the UE through an RRC connection re-establishment procedure after RRC connection re-establishment is completed. In this case, the UE does not perform the relocation of the bearer of a corresponding cell because it does not release the SCell. During the RRC connection re-establishment procedure, the UE may notify the network that the corresponding cell is a valid serving cell, but is a serving cell whose use has been stopped.

In accordance with the operation method based on configuration handling according to an embodiment of the present invention, when a serving cell is released, UE can handle the measurement configuration and/or bearer configuration of a corresponding cell. Since a measurement configuration is released when a cell is released, the execution of unnecessary measurement can be prevented, and unnecessary signaling for a measurement report can be prevented. Since a bearer is relocated when a cell is released, use efficiency of radio sources can be improved data throughput can be improved.

Figure 16:
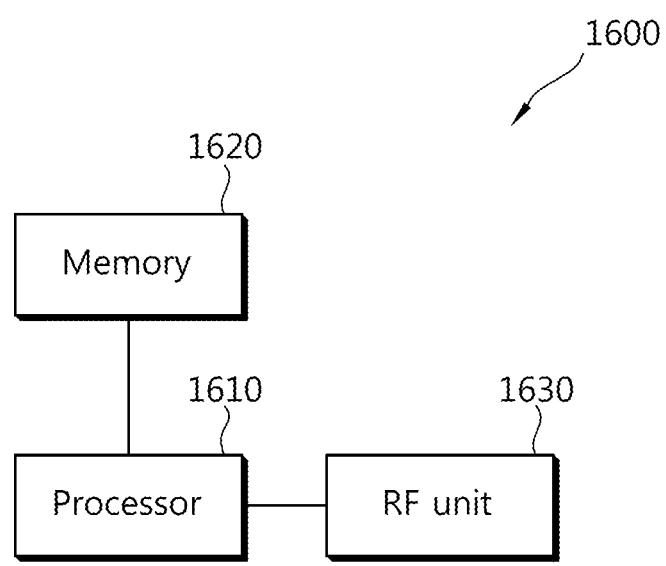
FIG. 16 is a block diagram showing a wireless apparatus in which an embodiment of the present invention is implemented.

FIG. 16 is a block diagram showing a wireless apparatus in which an embodiment of the present invention is implemented. The apparatus may be implemented as UE or a network system which performs the operation method based on configuration handling according to an embodiment of the present invention.

Referring to FIG. 16, the wireless apparatus 1600 includes a processor 1610, memory 1620, and a radio frequency (RF) unit 1630. The processor 1610 implements the proposed functions, processes and/or methods. The processor 1610 may be configured to perform the embodiments of the present invention described with reference to FIGS. 14 and 15.

The RF unit 1630 is connected to the processor 1610, and sends and receives radio signals.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include baseband circuits for processing radio signals. When the embodiment is implemented in software, the aforementioned scheme may be implemented as a module (process or function) that performs the aforementioned function. The module may be stored in the memory and executed by the processor. The memory may be placed inside or outside the processor and may be connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for operating a cell performed by a user equipment (UE) in a wireless communication system, the method comprising:
   connecting to a primary cell (PCell);
   connecting to a secondary cell (SCell);
   releasing the SCell while the UE maintains a connection between the UE and the PCell; and
   performing a configuration related to the released SCell when the SCell is released,
   wherein the configuration comprises a measurement configuration for performing measurements and a report on the SCell, or a bearer configuration configured in the SCell, and
   wherein the measurement configuration is a measurement configuration for relaxed measurements comprising measurements performed with lower frequency than common measurements.

2. The method of claim 1, wherein:
   the measurement configuration is a measurement configuration for relaxed measurements, and
   the relaxed measurements comprise measurements in which an omission of use of a measurement gap configured in the UE is permitted.

3. The method of claim 1, wherein performing the configuration comprises releasing the measurement configuration.

4. The method of claim 1, wherein performing the configuration comprises relocating a bearer served by the second serving cell SCell based on the bearer configuration.

5. The method of claim 4, wherein relocating the bearer comprises reassociating a data radio bearer (DRB) served by the SCell with the PCell.

6. The method of claim 5, wherein reassociating the DRB with the PCell comprises a reassociation of a packet data convergence protocol (PDCP).

7. The method of claim 5, wherein the reassociation of the DRB with the PCell comprises a reassociation of radio link control (RLC).

8. The method of claim 1, wherein:
   the PCell is a macro cell, and
   the SCell is a small cell deployed in coverage of a macro cell.

9. A user equipment (UE), the UE comprises:
   a radio frequency (RF) unit that sends and receives radio signals; and
   a processor, operatively coupled to the RF unit, that:
   connects to a primary cell (PCell),
   connects to a secondary cell (SCell),
   releases the SCell while the UE maintains a connection between the UE and the PCell, and
   performs a configuration related to the released SCell when the SCell is released,
   wherein the configuration comprises a measurement configuration for performing measurements and a report on the SCell, or a bearer configuration configured in the SCell, and
   wherein the measurement configuration is a measurement configuration for relaxed measurements comprising measurements performed with lower frequency than common measurements.

* * * * *